United States Patent
Hardesty

(10) Patent No.: US 6,371,704 B1
(45) Date of Patent: Apr. 16, 2002

(54) ANTI-WHIP DEVICE FOR DRIVE SCREWS OF MACHINE TOOLS

(75) Inventor: Michael P. Hardesty, Dale, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 09/629,508

(22) Filed: Aug. 1, 2000

(51) Int. Cl.$^7$ ................................................. B23Q 5/40
(52) U.S. Cl. ...................... 409/141; 74/89.36; 408/234; 409/235; 409/238
(58) Field of Search .................. 409/134, 141, 409/190, 202, 235, 238; 408/234, 237; 74/89.23, 89.32, 89.36

(56) References Cited

U.S. PATENT DOCUMENTS 5,425,607 A * 6/1995 Hardesty ..................... 409/238
5,482,416 A * 1/1996 Reko ........................... 409/238

* cited by examiner

Primary Examiner—Daniel W. Howell
(74) Attorney, Agent, or Firm—Lalos & Keegan

(57) ABSTRACT

In a machine tool having a base member, a member moveable relative to the base member, an elongated drive screw supported on the base member and an operative connection between the moveable member and the drive screw whereby upon driving the drive screw the moveable member will be caused to be displaced relative to the base member, an anti-whip device generally consisting of a drive screw support member pivotally supported on the base member, having angularly spaced arm sections alternatively disposable in a line of travel of the operative connection and engageable with the elongated drive screw in supporting relation at points intermediate the ends thereof, each of the arm sections being engageable by a component of the moveable member as it traverses in a selected direction to cause the arm section to pivot out of its drive screw support engagement, ahead of the operative connection, and simultaneously cause the other of the arm sections to pivot into its drive screw support engagement, behind the passage of the operative connection, and means for yieldingly biasing each of the arm sections into engagement with the drive screw when the arm section is in its drive screw engaging position.

10 Claims, 4 Drawing Sheets

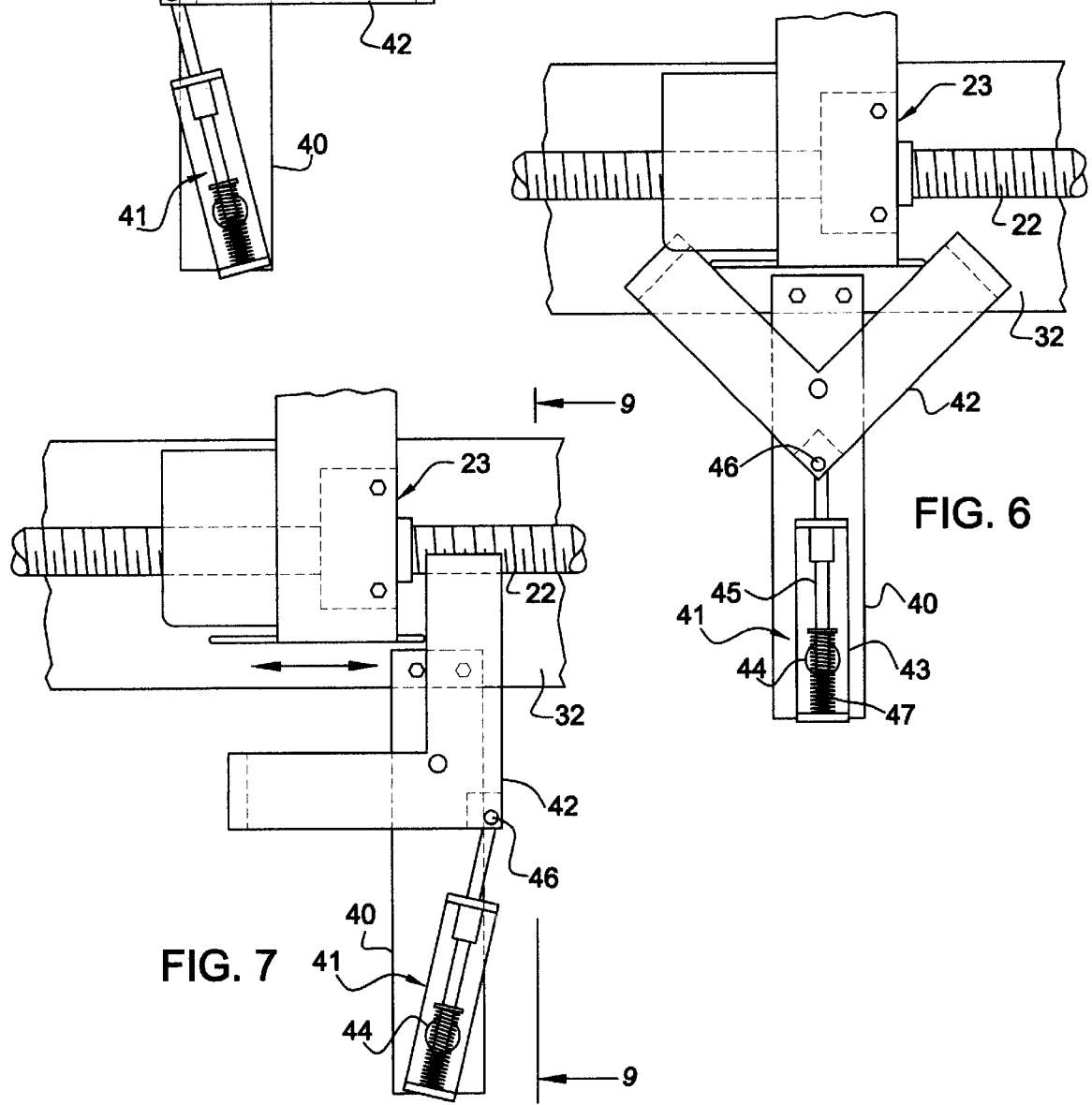

ANTI-WHIP DEVICE FOR DRIVE SCREWS OF MACHINE TOOLS

This invention relates to machine tools and more particularly to an anti-whip device for a drive screw of a machine tool used to displace one component relative to another component of the machine.

BACKGROUND OF THE INVENTION

In a particular type of machine tool in the prior art, there is provided a base member, a workpiece support table mounted on the base member, a gantry member supported on the base member and adapted to be displaced relative to the base member along a longitudinal line of travel commonly referred to as the y-axis, a toolhead support assembly mounted on the gantry member and adapted to be displaced relative to the gantry along a transverse line of travel commonly referred to as the x-axis, and a toolhead assembly having one or more tools mounted thereon and engageable with a workpiece positioned on the worktable, mounted on the toolhead support assembly and adapted to be displaced along a vertical line of travel commonly referred to as the z-axis.

Typically, the gantry member is supported on a pair of guideways rigidly secured to the base member, and is displaceable along the y-axis by a pair of elongated drive screws mounted on the sides of the base member, operatively connected to the gantry member. Each of such drive screws is supported at its ends on bearings mounted in brackets secured to the base member, is driven by a motor mounted on the base member and operatively connected to an end portion of the drive screw and further is provided with a follower assembly secured to the gantry member and operatively connected to the drive screw so that upon operation of the drive motor to rotate the drive screw, the interaction between the drive screw and the follower assembly will cause the gantry member to be displaced along the y-axis.

Because such elongated drive screws are supported only at their ends, the middle portions thereof tend to sag, creating an out of balance condition when the drive screws are rotated, particularly at high speeds. As the drive screw is driven at higher speeds, the center thereof characteristically begins to rotate in larger and larger circles until a critical speed at which point the drive screw vibrates violently, a condition which adversely affects the operation and longevity of the machine and which is sought to be avoided.

The problem presented by such operating condition of drive screws of machines of the type described has to a large extent obviated by the use of supports for the mid-portions of such drive screws as provided in U.S. Pat. No. 5,425,607. In the anti-whip device disclosed in such patent, the device supporting the mid-portion of a drive screw operated to displaced the gantry member along the Y-axis is adapted to be cammed out of the path of the leg section of the gantry member operatively connected to the drive screw. It has been found, however, that although the anti-whip device provided for in such patent is highly effective in supporting the mid-portion of the drive screw, thus preventing a whipping action of the screw, it is not entirely effective in supporting the drive screw and is fairly costly to manufacture and install. It thus has been found to be desirable to provide an anti-whip device operable to support the mid-portion of a drive screw of a machine of the type described, which is as effective as the anti-whip device of the aforementioned patent but less costly to manufacture and install.

SUMMARY OF THE INVENTION

In providing an improvement over prior art devices for supporting the mid-portions of drive screws in a machine of the type described, the present invention provides for a drive screw support member supported on the base member of the machine for pivotal movement about a transverse axis, having angularly spaced arm sections alternatively disposable in a line of travel of the operating connection of the gantry to the drive screw and engageable with the drive screw in supporting relation at a point intermediate the ends thereof, each such arm sections being engageable by a component of the gantry member as it traverses along the drive screw to cause such arm section to be engaged and pivoted out of its drive screw support engagement, ahead of such operative connection and simultaneously cause the other of such arm sections to pivot into its drive screw support engagement, behind the passage of the operative connection between the gantry and the drive screw. Biasing means in the form a of spring interconnecting the base member of the machine and the drive screw support member, alternatively yieldingly biases the arm sections of the support member into support engagement with the mid-section of the drive screw.

BRIEF DESCRIPTION OF THE DRAWINGS

FIG. 5 is a view similar to the view shown in FIG. 2, illustrating a modification of the embodiment shown in FIGS. 2 through 4 in which a different form of biasing means is employed;

FIG. 6 is a view similar to the view shown in FIG. 3, illustrating the embodiment shown in FIG. 5;

FIG. 7 is a view similar to the view shown in FIG. 4, illustrating the embodiment shown in FIGS. 5 and 6;

DESCRIPTION OF THE PREFERRED EMBODIMENTS OF THE INVENTION

Figure 1:
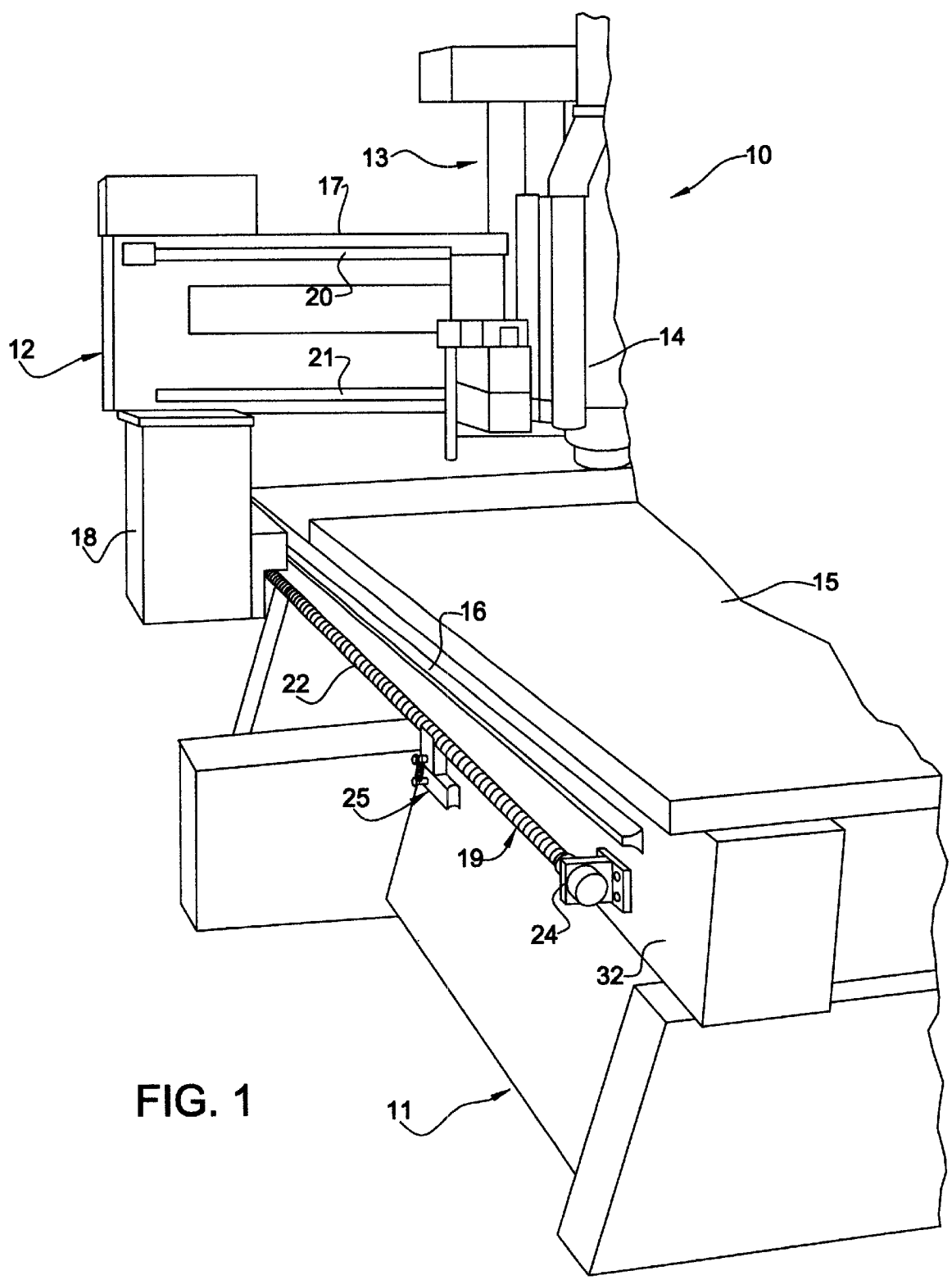
FIG. 1 is a perspective view of a machine tool equipped with an anti-whip device embodying the present invention, having a portion thereof broken away.

Referring to FIG. 1 of the drawings, there is illustrated a router machine 10 which essentially is constructed and operates similar to the machine illustrated and described in U.S. Pat. No. 5,425,607 which is incorporated herein by reference. The machine is operatively connected to a controller which operates the machine to displace a tool of the machine along a longitudinal line of travel or y-axis, a transverse line of travel or x-axis and along a vertical line of travel or a z-axis in accordance with a program loaded into the controller to perform various work functions on one or more workpieces positioned on the machine. The machine generally includes a base member 11, a gantry member 12, a toolhead support assembly 13, and a toolhead assembly 14. The base member is provided with a worktable 15 rigidly mounted thereon and a set of longitudinal disposed guideways 16, 16 mounted on the sides of the base member. Worktable 15 is adapted to support one or more workpieces to be machined. Such workpieces are adapted to be positioned by means of positioning means or other pins and are secured in position by clamps, a vacuum holddown system or by other means.

Gantry member 12 includes a transversely disposed beam section 17 spaced above and spanning the base member and a pair of transversely spaced, depending leg sections 18, 18 straddling the sides of the base member and supported on guideways 16, 16 for displacement relative to the base member along the y-axis. The bridge member is displaced relative to the base member along the y-axis by means of a pair of drive screw assemblies 19, 19 operatively interconnecting the side portions of the base member and the inner side portions of leg sections 18, 18.

Toolhead support assembly 13 is supported on and guided along a pair of transversely disposed, vertically spaced guideways 20 and 21 disposed on a front face of transverse beam section 17, and displaced along the x-axis by a drive screw assembly operatively interconnecting the transverse beam section of the bridge member and the toolhead support assembly. The toolhead assembly is supported and displaceable along vertical guideways mounted on toolhead support assembly 13 and is adapted to be displaced by a drive screw assembly operatively interconnecting the support assembly and the toolhead assembly. The toolhead assembly further is provided with a depending tool such as a router, drill, sanding wheel and the like adapted to be brought into contact with one or more workpieces mounted on the worktable to perform various work functions such as routing, drilling, sanding and the like in accordance with the program loaded into the controller.

Figure 8:
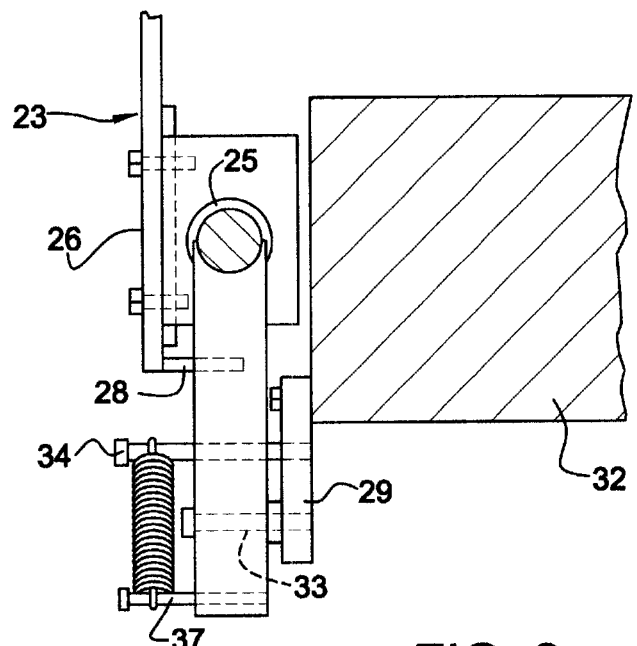
FIG. 8 is a cross sectional view taken along line 8—8 in FIG. 4.
Figure 9:
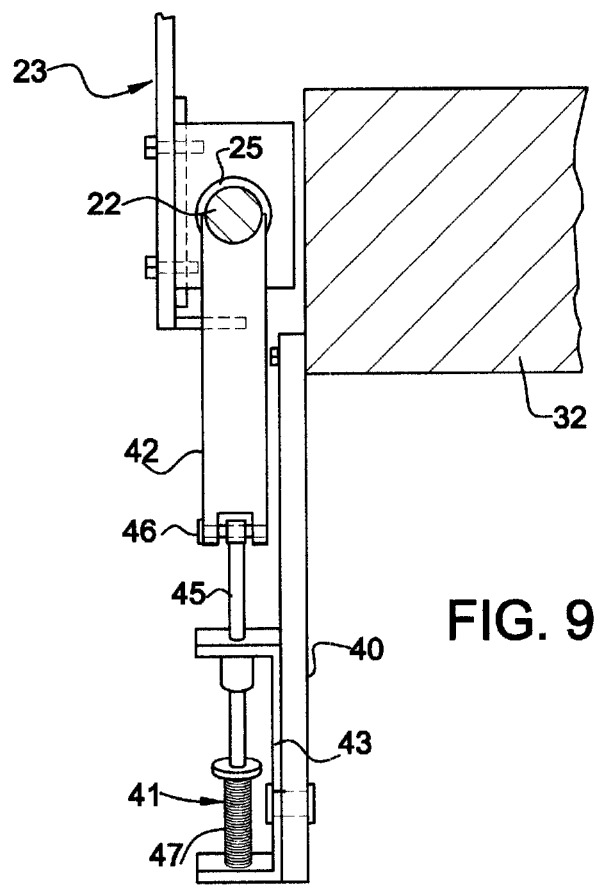
FIG. 9 is; a cross sectional view taken along line 9—9 in FIG. 7.

Each drive screw assembly 19 includes a drive screw 22 disposed longitudinally along a side of the base member and a cooperating follower assembly 23 mounted on the inner side of a leg section of the bridge member. Drive screw 22 is supported at its ends in bearings mounted in brackets 24, 24, is supported at a point intermediate at the ends thereof by an anti-whip device 25, and is driven by a motor mounted on one of the support brackets. As best shown in FIG. 8, follower assembly 23 includes a ballnut member 25 mounted on the inner side of a depending bracket 26 mounted on the inner side of a gantry leg section 18, and cooperating with a drive screw 22 so that upon rotation of the drive screw, the ballnut member will cause the gantry to displace longitudinally along the x-axis, in the conventional manner. Depending bracket 26 further is provided at a lower end thereof with longitudinally aligned, forwardly and rearwardly projecting abutment portions 27 and 28 adapted to cooperate with components of anti-whip device 25 for displacing such components out of support relationship with the drive screw as the follower assembly traverses past the anti-whip device as will hereinafter be described.

Figure 2:
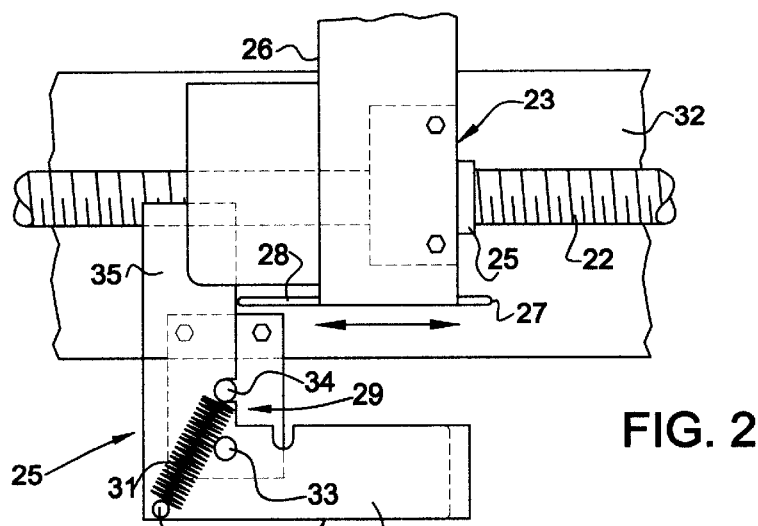
FIG. 2 is an enlarged, side view of the anti-whip device shown in FIG. 1, illustrating one of the arm sections of the device supporting a drive screw and the operative connection between the gantry of the machine and such drive screw approaching such supporting arm member.
Figure 3:
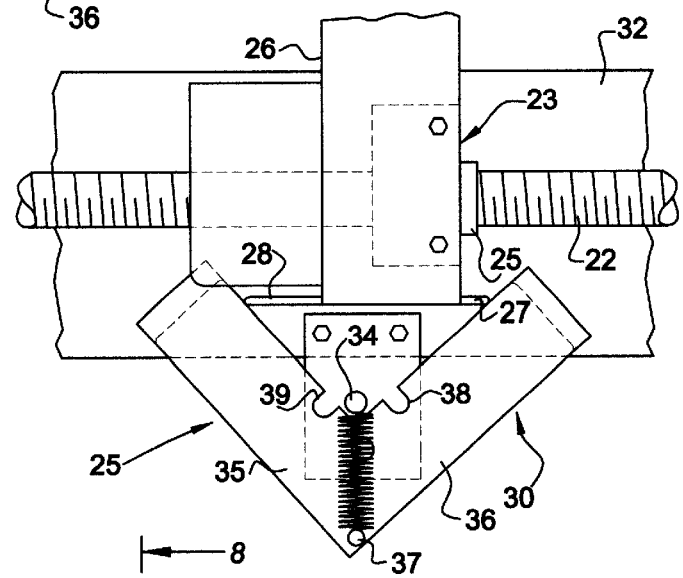
FIG. 3 is a view similarly to the view shown in FIG. 2, illustrating the operative connection between the gantry member and the drive screw having pivotally displaced the supporting arm member out of engagement with the drive screw, and positioned between the arm sections of the device.
Figure 4:
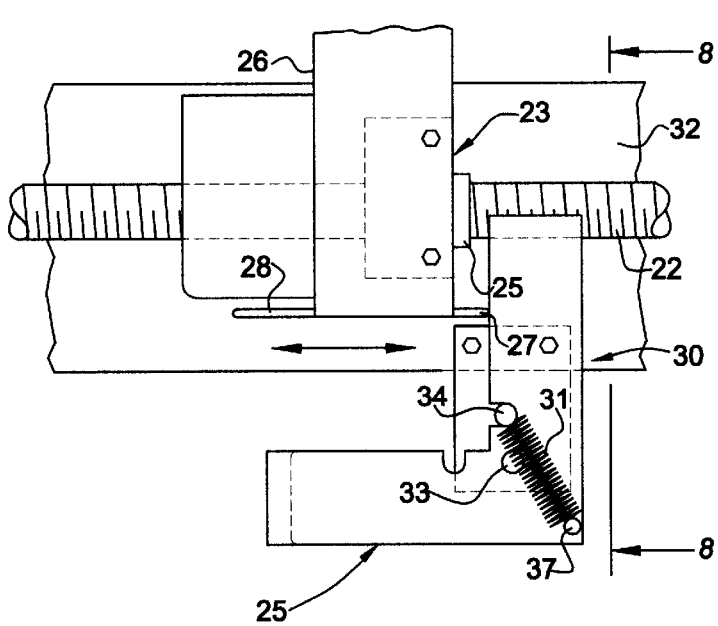
FIG. 4 is a view similar to the view shown in FIGS. 2 and 3, illustrating the operative connection between the gantry member and the drive screw having sufficiently pivotally displaced the supporting arm section of the device, thus causing the biasing spring of the device to cause the other arm section to be pivoted upwardly into a drive screw supporting position.

Referring to FIGS. 2 through 4 and 8, anti-whip device 25 includes a mounting bracket 29, a support member 30 and a spring 31. Mounting bracket 29 depends from the outer side wall of a longitudinal section 32 of the base member and is secured thereto by a set bolts. As best shown in FIG. 8, mounting bracket 29 is provided with a lower, laterally projecting mounting pin 33 and an upper, laterally projecting connecting pin 34 extending laterally a greater distance than mounting pin 33 and being vertically aligned therewith. Support member 30 has a right angle configuration including arm sections 35 and 36, and is pivotally connected to mounting pin 33 on a centerline bisecting the support member and lying at an angle of 45 degrees relative to the arm sections. The support member is adapted to pivot in a vertical plane including the axis of drive screw 22, about the axis of mounting pin 33 so that the end portions of arm sections 35 and 36 alternatively may be positioned in support engagement with lower portions of drive screw 22 when angularly displaced, as illustrated in FIGS. 2 and 4. As best shown in FIG. 8, the ends of arm sections 35 and 36 are provided with semi-cylindrically configured recesses for receiving and thus cradling lower portions of the drive screw. Spring 31 interconnects mounting pin 34 and a spaced mounting pin 37 projecting laterally from support member 30 and which also is disposed on the centerline of support member 30. Spring 31 functions to urge one of the arm sections of the support member into its drive screw support position whenever the centerline of the support member is disposed to either side of a vertical plane passing through the axis of pivot pin 83 in and over-the-center condition. The arm sections of the support member are permitted to assume vertical, drive screw support positions without obstruction by connecting pin 34 by means of recesses 38 and 39 provided on the inner edges of the arm members which are adapted to receive connecting pin 34 when the arm members are in their vertical, drive screw supporting positions.

Whenever the gantry member is positioned either forwardly or rearwardly of the anti-whip device, one of the arm sections of the support member of the device will be disposed vertically and engage a mid-portion of the drive screw in supporting relation to prevent oscillation of the drive screw, and will be urged in such position by spring 31, as shown in FIGS. 2 and 4. Whenever the gantry is in a position forwardly of the device and is displaced rearwardly along the y-axis, the follower assembly will be able to traverse past the anti-whip device by means of abutment portion 28 engaging an inner side of arm section 35 and thus pivoting support member 30 in a counterclockwise direction against the biasing action of spring 31 to angularly displace arm section 35 out of the path of the follower assembly. Support member 30 will pivot through the sequence shown in FIGS. 2 through 4 to cause arm section 36 to position itself in its drive screw support position behind the passing follower assembly under the biasing action of spring 31. Similarly, whenever the gantry is in a position rearwardly of the anti-whip device and is displaced forwardly, abutment portion 27 of the follower assembly will engage on arm section 36 as shown in FIG. 4 to pivot the support member in a clockwise direction and angularly displace arm section 36 out of the path of the follower assembly and angularly displace arm section 35 into its drive screw support position behind the follower assembly. Whenever a connecting pin 37 is angularly displaced to either side of a vertical plane passing through the axis of connecting pin 33, spring 31 will function to bias an arm section into its support position relative to the drive screw behind the traversing follower assembly.

The embodiment shown in FIGS. 5 through 7 and 9 is similar in construction and operation to the embodiment shown in FIGS. 2 through 4 and 8 with the exception of the biasing means utilized to urge one of the arm sections into its drive screw support position as the follower assembly traverses past the anti-whip device. The embodiment provides an elongated, depending bracket 40 having a spring assembly 41 interconnecting the depending bracket and the support member 42 the spring assembly includes a c-shaped base member 43 pivotally connected to a lower end of depending bracket 40 by means of a pivot pin 44 a rod member 45 slideably disposed in an upper end of base member 43 and pivotally connected to a connecting pin 46 mounted on the centerline of support member 42, and a spring 47 disposed between base member 40 and rod member 45 which is adapted to be compressed when the support member is in the position as shown in FIG. 6 and extended when the support member is in an off-center position to bias one of the arm sections of the support member into its drive screw support position as shown in FIGS. 5 and 7.

In either of the embodiments illustrated and described, there is provided a simple mechanism effective in providing a support for a mid-section of a drive screw which permits a follower assembly of a gantry leg section to easily pass through the anti-whip device and immediately restore the device to its drive screw supporting position. The device not only is simple in design but easily manufactured and installed in new and existing machines.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. In a machine tool having a base member, a member moveable relative to said base member, an elongated drive screw supported on said base member and an operative connection of said moveable member to said drive screw whereby upon driving said drive screw said moveable member will be caused to be displaced relative to said base member, an anti-whip device comprising:

a drive screw support member pivotally supported on said base member, having angularly spaced arm sections alternatively displaceable in a line of travel of said operative connection and engageable with said elongated drive screw in supporting relation points intermediate at the ends thereof, each of said arm sections being engageable by a component of said moveable member as it traverses a selected direction to cause one of said arm sections disposed in supporting relation with said drive screw to pivot out of its drive screw support engagement, ahead of said operative connection, and simultaneously cause the other of said arm sections to pivot into its drive screw support engagement, behind the passage of said operative connection; and means for yieldingly biasing each of said arm sections into engagement with said drive screw when said arm section is in its drive screw engaging position.

2. A device according to claim 1 wherein the end of each of said arm sections is provided with a recess for receiving and cradling a portion of said drive screw.

3. A device according to claim 2 wherein said recess has a semi-cylindrical configuration.

4. A device according to claim 1 wherein said biasing means comprises a spring.

5. A device according to claim 4 wherein said spring operatively interconnects said support member and a portion of said base member.

6. A device according to claim 5 wherein said spring is a tension spring.

7. A device according to claim 5 wherein said spring is compression spring.

8. A device according to claim 5 wherein said spring is connected to said support member whereby upon one of said arm sections engaging said drive screw in supporting relation, said spring connection will be disposed in an off-center position relative to the pivot axis of said support member to provide a biasing force urging said support arm section into supporting relation with said drive screw.

9. A device according to claim 1 wherein the angular spacing between said arm sections is sufficiently great to allow the passage of said operative connection past said support member as one of said arm sections pivots out of its drive screw engagement position ahead of said operative connection and the other of said arm sections pivots into its drive screw engaging position behind said operative connection.

10. In a machine tool having a base member, a member moveable relative to said base member, an elongated drive screw supported on said base member and an operative connection of said moveable member to said drive screw whereby upon driving said drive screw said moveable member will be caused to be displaced relative to said base member, an anti-whip comprising:

a drive screw support member pivotally supported on said base member, having angularly spaced, symmetrical arm sections alternatively disposable in a line of travel of said operative connection and engageable with said elongated drive screw in supporting relation at points intermediate the ends thereof, each of said arm sections being engageable by a component of said moveable member as it traverses in a selected direction to cause said arm section to pivot out of drive support engagement with said drive screw, ahead of said operative connection, and simultaneously cause the other of said arm sections to pivot into drive screw support engagement, behind the passage of said operative connection, with the pivot axis of said support means being disposed on a line of symmetry of said arm section; and means for a yieldingly biasing each of said arm sections into engagement with said drive screw when said arm section is in its drive screw engaging position.

* * * * *